(12) United States Patent
Vosseller

(10) Patent No.: US 7,849,487 B1
(45) Date of Patent: Dec. 7, 2010

(54) REVIEW SPEED ADJUSTMENT MARKER

(75) Inventor: Shannon B. Vosseller, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1492 days.

(21) Appl. No.: 10/160,988

(22) Filed: May 31, 2002

(51) Int. Cl.
*H04N 7/173* (2006.01)
(52) U.S. Cl. .......................................... 725/88; 725/102
(58) Field of Classification Search .................... 725/88, 725/102
See application file for complete search history.

(56) References Cited

U.S. PATENT DOCUMENTS

| | | | |
|---|---|---|---|
| 4,550,349 A | 10/1985 | Okuyama et al. | |
| 4,649,442 A | 3/1987 | Kunii et al. | |
| 5,953,073 A | 9/1999 | Kozina et al. | |
| 5,956,037 A * | 9/1999 | Osawa et al. | 345/418 |
| 6,549,718 B1 * | 4/2003 | Grooters et al. | 386/83 |
| 6,588,015 B1 * | 7/2003 | Eyer et al. | 725/89 |
| 6,909,837 B1 * | 6/2005 | Unger | 386/68 |
| 7,043,747 B1 * | 5/2006 | Cohen | 725/34 |
| 2002/0162121 A1 * | 10/2002 | Mitchell | 725/135 |
| 2003/0037068 A1 * | 2/2003 | Thomas et al. | 707/200 |

FOREIGN PATENT DOCUMENTS

| | | |
|---|---|---|
| WO | WO 00/01149 | 1/2000 |
| WO | WO 00/59214 | 10/2000 |
| WO | WO0239450 A2 | 5/2002 |

OTHER PUBLICATIONS

"Advanced Television Enhancement Forum Specification (ATVEF)", Comment Draft Version 1.0r1, ATVEF, 1998, XP-002142688, 24 pages.
"The DVB MHP Specification- A Guided Tour", Vogt, C., World Broadcast Engineering, Mar. 2000, XP-002269844, pp. 1-8.
Kobla, et al., "Indexing and retrieval of the MPEG compressed video"; Journal of Electronic Imaging; Apr. 1998; vol. 7(2); pp. 294-307.
Kiya, et al; "A Method of Inserting Binary Data into MPEG Bitstreams for Video Index Labeling"; 0-7803-5467-2/99; 1999 IEEE; pp. 285-289.
Lienhart, et al; "Automatic text segmentation and text recognition for video indexing"; Multimedia Systems 8: 69-81 (2000).
DuBoyce, "A Time Code User-Bit Hierarchy for Multidisciplinary Applications", SMPTE Journal, No. XP000172374, No. 12, Dec. 1, 1990, pp. 993-996.
Official Communication from the European Patent Office for Application No. 03 007 973.5—1247, mailed on Apr. 14, 2009, 6 pgs.

* cited by examiner

*Primary Examiner*—Brian T Pendleton
*Assistant Examiner*—Olugbenga Idowu
(74) *Attorney, Agent, or Firm*—Lee & Hayes, PLLC

(57) ABSTRACT

A digital video playback architecture utilizes review speed adjustment markers to enable viewer recognition of an event in a video program during fast advance of the video, either in a fast-forward advance mode or a rewind advance mode. A review speed adjustment marker gives the viewer time to recognize, or otherwise ascertain, an event in the video and stop the fast advance to review the video content, or other information, associated with the review speed adjustment marker at a normal playback speed.

28 Claims, 6 Drawing Sheets

REVIEW SPEED ADJUSTMENT MARKER

TECHNICAL FIELD

This invention relates to video and audio presentations for television entertainment and, in particular, to systems and procedures for review speed adjustment markers.

BACKGROUND

Various types of video playback devices, such as personal video recorders or client devices in a television-based entertainment system, can be directed to fast advance through a video program with a user input. A video program can be directed to advance either in a fast-forward advance or rewind advance mode. Conventional video playback devices, however, do not fast advance through a video program, or movie for example, such that a viewer can discern from rendered images of the video how far the video has been advanced. Further, when fast advancing through a program, movie, news report, sporting event, and the like, a viewer will likely advance past any events or sections of video that might be of interest to the viewer without an indication of the events.

For example, a VCR fast-forwards through an analog VHS movie providing the viewer with only a numerical counter to indicate the progression of advance through the video. With digital video, such as a movie on a DVD, a viewer can fast advance through the digital video by jumping to predefined index points in the video. The viewer fast advances through the video from index point to index point, missing content that might be of interest to the viewer without an indication of such content.

Accordingly, for video playback devices, such as personal video recorders or client devices in television-based entertainment systems, there is a need for techniques to enable a viewer to recognize an event in a video program while fast advancing the video, either in a fast-forward advance or rewind advance mode.

SUMMARY

A digital video playback architecture utilizes review speed adjustment markers to enable viewer recognition of an event in a video program during fast advance of the video, either in a fast-forward advance mode or a rewind advance mode. A review speed adjustment marker gives the viewer time to recognize, or otherwise ascertain, an event in the video and stop the fast advance to review the video content, or other information, associated with the review speed adjustment marker at a normal playback speed.

In an implementation, the architecture recognizes review speed adjustment markers in the video content and obtains information corresponding to the review speed adjustment marker. Examples of possible information include audio content, video content, text information, and/or still image data. The architecture slows the fast advance of the video content at the review speed adjustment marker, substitutes information corresponding to the review speed adjustment marker, and/or renders the information corresponding to the review speed adjustment marker at a viewer-discernable speed.

BRIEF DESCRIPTION OF THE DRAWINGS

The same numbers are used throughout the drawings to reference like features and components.

DETAILED DESCRIPTION

Review speed adjustment markers are described as a digital video playback feature that enables a viewer to recognize an event in a video program while fast advancing the video, either in a fast-forward advance or rewind advance mode. A review speed adjustment marker gives the viewer time to recognize, or otherwise ascertain, an event in the video and stop the fast advance to review the video, or other information, associated with the review speed adjustment marker at a normal playback speed. In an implementation, the video jumps back to the beginning of the video or information when the viewer stops the advance. This feature also enables a viewer to watch longer programs at a faster speed than the normal playback speed, and in a shorter amount of time.

The following discussion is directed to television-based entertainment and information systems, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and procedures can be used in any of these systems and for any types of client devices, they are described in the context of the following exemplary environment.

Exemplary System Architecture

Figure 1:
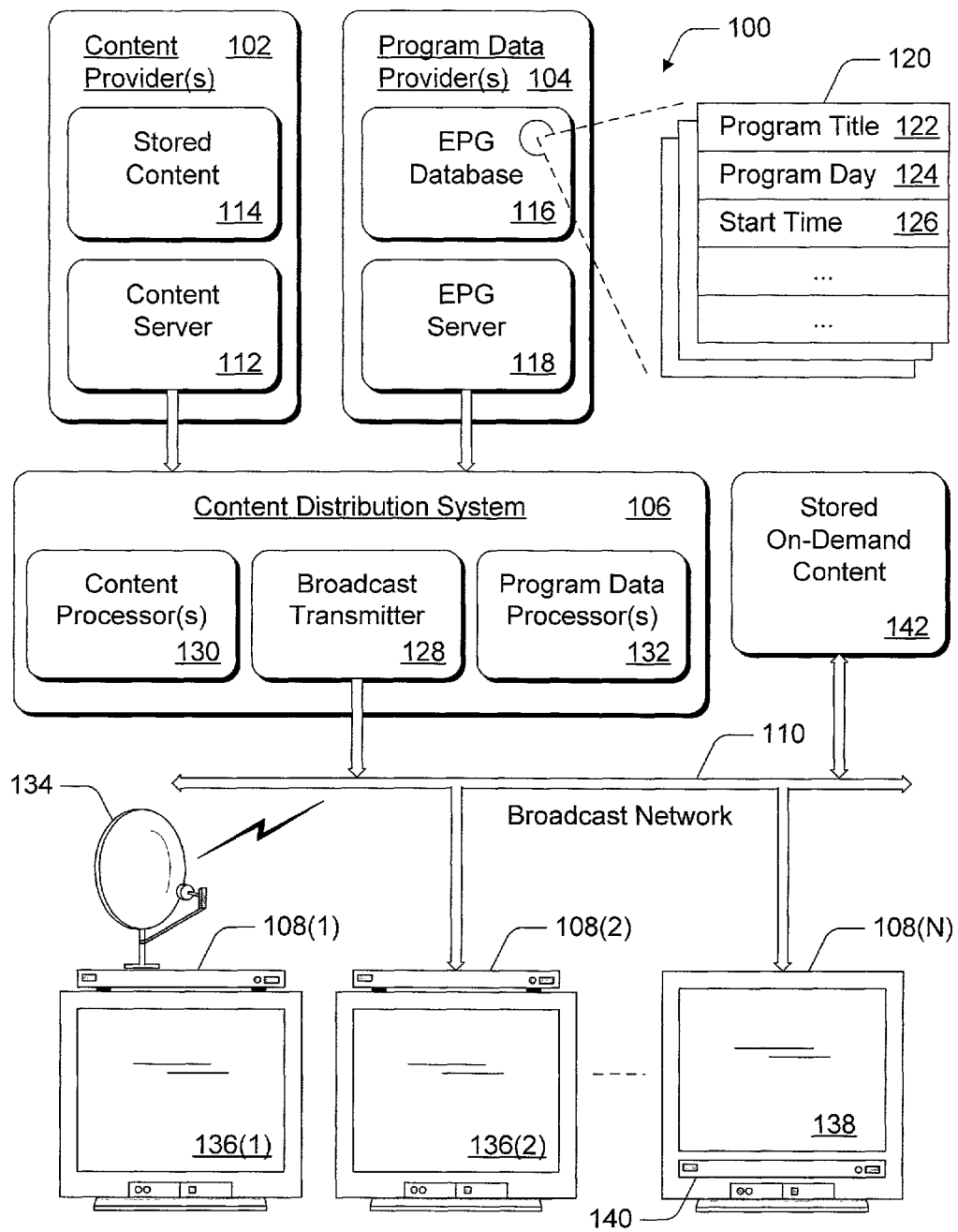
FIG. 1 illustrates an exemplary system architecture in which the systems and methods for review speed adjustment markers can be implemented.

FIG. 1 illustrates an exemplary television environment and information system 100 that is an architecture in which the methods and systems for review speed adjustment markers may be implemented. System 100 facilitates distribution of content and program data to multiple viewers, and allows a viewer to recognize an event when fast advancing through video and/or audio content. The system 100 includes one or more content providers 102, one or more program data providers 104, a content distribution system 106, and multiple client devices 108(1), 108(2), ..., 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 112 controls distribution of live content (e.g., content that was not previously stored, such as live feeds) and/or content stored at other locations to the content distribution system 106.

Program data provider 104 includes an electronic program guide (EPG) database 116 and an EPG server 118. The EPG database 116 stores electronic files of program data (or, "EPG data") which is used to generate an electronic program guide (or, "program guide"). An electronic file maintains program data 120 that may include a program title 122, program broadcast day(s) 124 to identify which days of the week the program will be shown, and program start time(s) 126 to identify a time that the program will be shown on the particular day or days of the week. Program data can also include program ratings, characters, descriptions, actor names, station identifiers, channel identifiers, schedule information, and so on.

The EPG server 118 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 118 controls distribution of the published version of the program data from content program data provider 104 to the content distribution system 106 using, for example, a file transfer protocol (FTP) over a TCP/IP network (e.g., Internet or Intranet) or an in-band video stream transport to deliver the program data and additional data with a broadcast. Further, the published version of the program data can be transmitted from program data provider 104 via a satellite and the content distribution system 106 directly to a client device 108.

Content distribution system 106 includes a broadcast transmitter 128, one or more content processors 130, and one or more program data processors 132. Broadcast transmitter 128 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processor 130 processes the content and program data received from content provider 102 prior to transmitting the content and program data across broadcast network 110. Similarly, program data processor 132 processes the program data received from program data provider 104 prior to transmitting the program data across broadcast network 110. A particular content processor 130 may encode, or otherwise process, the received content into a format that is understood by the multiple client devices 108(1), 108(2), ..., 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service that provides EPG data, as well as content, to multiple subscribers. Each content distribution system 106 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), ..., 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via a satellite dish 134. Client device 108(1) is also referred to as a set-top box or a satellite receiving device. Client device 108(1) is coupled to a television 136(1) for presenting the content received by the client device (e.g., audio data and video data), as well as a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive broadcast content from broadcast network 110 and provide the received content to associated television 136(2). Client device 108(N) is an example of a combination television 138 and integrated set-top box 140. In this example, the various components and functionality of the set-top box are integrated into the television, rather than using two separate devices. The set-top box integrated into the television can receive broadcast signals via a satellite dish (similar to satellite dish 134) and/or via broadcast network 110. In alternate implementations, client devices 108 may receive broadcast signals via the Internet or any other broadcast medium.

Each client device 108 runs an electronic program guide (EPG) application that utilizes the program data. An EPG application enables a television viewer to navigate through an onscreen program guide and locate television shows and other broadcast content of interest to the viewer. With an EPG application, the television viewer can look at schedules of current and future programming, set reminders for upcoming programs, and/or enter instructions to record one or more television shows.

The exemplary system 100 also includes stored on-demand content 142, such as Video On-Demand (VOD) movie content. The stored on-demand content can be viewed with a television 136 via a client device 108 through an onscreen movie guide, for example, and a viewer can enter instructions to stream a particular movie, or other stored content, down to a corresponding client device 108.

Exemplary Client Device

Figure 2:
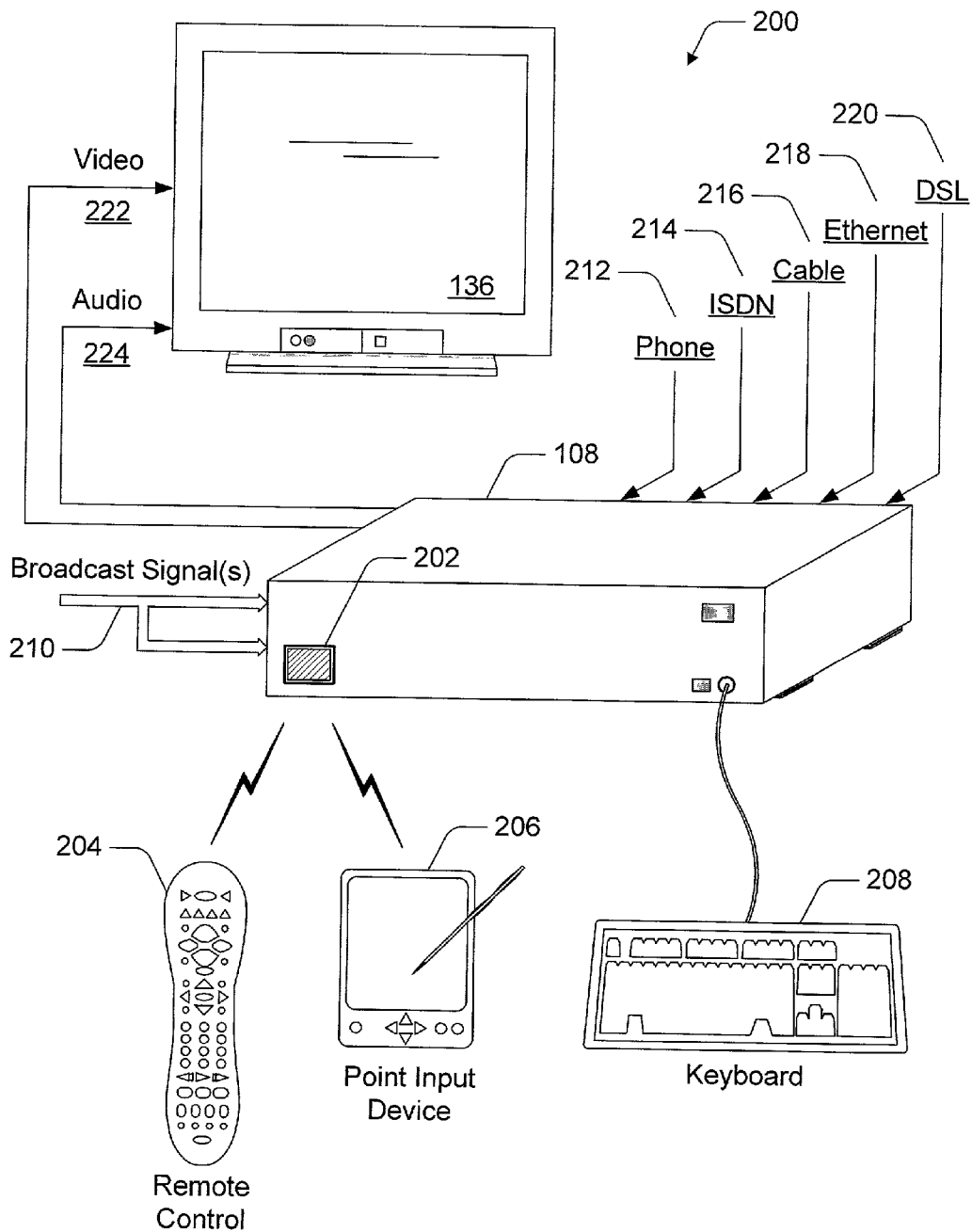
FIG. 2 illustrates of an example client device, a television, and various input devices that interact with the client device.

FIG. 2 illustrates an exemplary implementation 200 of a client device 108 shown as a standalone unit that connects to a television 136. Client device 108 can be implemented in any number of embodiments, including as a set-top box, a satellite receiver, a TV recorder with a hard disk, a digital video recorder (DVR) and playback system, a personal video recorder (PVR) and playback system, a game console, an information appliance, and so forth.

Client device 108 includes a wireless port 202, such as an infrared (IR), 802.11, or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 108. In alternate embodiments, remote control device 204, handheld device 206, and/or keyboard 208 may us an RF communication link or other mode of transmission to communicate with client device 108.

Client device 108 receives one or more broadcast signals 210 from one or more broadcast sources, such as from a satellite or from a broadcast network, such as broadcast network 110 (FIG. 1). Client device 108 includes hardware and/or software for receiving and decoding broadcast signal 210, such as an NTSC, PAL, SECAM, or other television system analog video signal, as well as a DVB, DSS, ATSC, or other television system digital video signal. Client device 108 also includes hardware and/or software for providing the user with a graphical user interface by which the user can, for example, access various network services, configure the client device 108, and perform other functions.

Client device 108 can communicate with other devices via one or more connections including an 802.11 wireless transport via wireless connection 202, a conventional telephone line 212, an ISDN link 214, a cable link 216, an Ethernet link 218, a DSL link 220, and the like. Client device 108 may use any one or more of the various communication links 202 and 212-220 at a particular instant to communicate with any number of other devices.

Client device 108 generates video signal(s) 222 and audio signal(s) 224, both of which are communicated to television 136. The video signals and audio signals can be communicated from client device 108 to television 136 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Exemplary Review Speed Adjustment Markers and System

Figure 3:
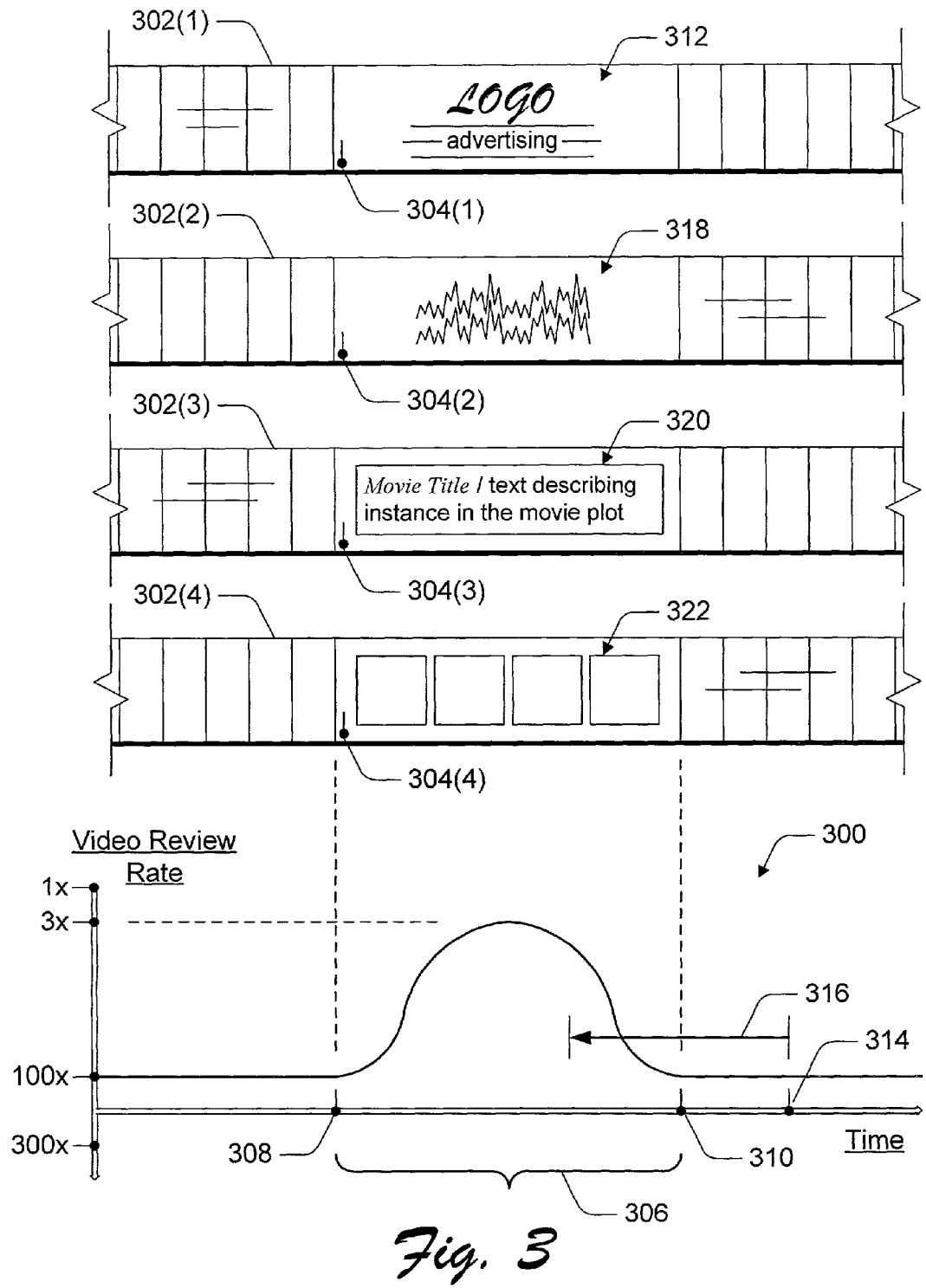
FIG. 3 illustrates an example of a review speed adjustment marker and information corresponding to the review speed adjustment marker.

FIG. 3 illustrates an example of review speed adjustment marker processing 300 and information corresponding to a review speed adjustment marker. Video content examples 302(1) through 302(4) have review speed adjustment markers 304(1) through 304(4), respectively, that are indication points within video content 302. The review speed adjustment markers 304 can be defined by a publisher of the content, a content provider 102, a network operator, or be based on client device 108 intelligence, such as video processing, audio processing, and/or encoded data such as closed captioning, ATVEF triggers, or other in or out of band data.

FIG. 3 shows that video examples 302 are displayed, or otherwise rendered, at a video review rate of 100x, where "x" (or "1x") is a normal playback speed. As used herein, "normal playback speed" is the speed or rate at which a video program is normally viewed or normally played back for viewing (i.e., not fast-forward and not slow-motion). When a review speed adjustment marker 304 is recognized in video content, the video examples 302 are rendered at a slower review rate for a time duration 306 from a beginning 308 of the review speed adjustment marker to an end 310 of the review speed adjustment marker. Although a review speed adjustment marker 304 is illustrated, or otherwise indicated, as a single indication point within video content 302, it is to be appreciated that a review speed adjustment marker can be defined to include a beginning indication point 308, a duration 306, and an ending indication point 310 within the video content.

In this example illustrated in FIG. 3, the video examples 302 are slowed at a variable rate from the video review rate of 100x to a video review rate of 3x before the video review rate begins to increase once past the slowest review rate point during review speed adjustment marker time duration 306. Time duration 306 can also be variable, depending on a viewer preference, on the type of information corresponding to a review speed adjustment marker, or based on other variables.

Review speed adjustment markers can be used for any number of implementations, such as for sporting events, news programs, enhanced advertisements, music videos, program indexing, movies, and the like. For example, video 302(1) displays a still image 312 at review speed adjustment marker 304(1) for duration 306 to provide a viewer with a discernable advertisement. If the video corresponding to review speed adjustment marker 304(1) is a commercial that would typically be fast advanced over when rendered for a time duration 306 of five seconds, very little of the commercial would be recognizable to the viewer. Rather, still image 312 displayed for the five seconds will be viewer-discernable and an advertiser will be able to communicate an advertising message to the viewer.

In one embodiment, if the viewer stops the fast advance when advertising image 312 is displayed to watch the entire commercial associated with the advertising image, the video jumps back to the beginning 308 of the review speed adjustment marker and the video for the commercial is displayed at a normal playback speed replacing the advertising image 312. When video 302 is fast advancing, and a viewer recognizes an advertisement that is of interest, the viewer may not stop the fast advance of the video before the end of duration 306.

For example, a viewer may stop the fast advance of video 302(1) to watch the commercial associated with advertising image 312 at a point 314 after time duration 306. A review speed adjustment marker processor in client device 108 can snap back (if fast advancing forward) a defined amount 316 of video, such as five seconds, to account for viewer reaction time when stopping the video fast advance. When the video snaps back the defined amount 316 to within duration 306 correlating to image 312 in video 302(1), the video then jumps back to the beginning 308 of the review speed adjustment marker and the video for the commercial is displayed at a normal playback speed. The defined amount 316 can be set as a default system value, as a viewer-definable value, and/or can be defined as a range of values.

Video example 302(2) broadcasts audio 318 at review speed adjustment marker 304(2) for duration 306 to provide a viewer with a discernable audio broadcast. Continuing with the advertising example, commercials rely not only on a visual aspect, but also on an audio aspect to convey a message to a viewer. In a video advance mode other than normal playback speed, the audio associated with a video is typically not broadcast because it would be imperceptible. However, a five second audio segment 314 broadcast during a five second time duration 306 will communicate a message to the viewer where otherwise no viewer-discernable message would be communicated. In this implementation, an audio segment can be broadcast instead of, or in addition to the video that is being fast advanced.

Auxiliary audio or video tracks can be broadcast in a data channel or on an alternate audio or video track such as VBI, SAP, or ATSC/DVB alternate streams. Any combination of video clips, audio segments, and still images can be combined and substituted into video content to convey a perceptible message to a viewer. The substitute content can be delivered in a broadcast, via other data transport mechanisms, or can be available on client device 108. The video content for a commercial can be advanced at a high speed while the corresponding audio is rendered at a perceptible low speed, or the audio for a commercial can be rendered at a high speed while the corresponding video is rendered at a perceptible low speed, or a still image, video clip, or audio segment can be substituted for the video and audio of a commercial.

Review speed adjustment markers can also be utilized for programs, such as for movie chapter and/or plot indexing. Video example 302(3) displays text information 320 at review speed adjustment marker 304(3) for duration 306 to describe an instance of a movie plot at the particular location in the video content. Thus, while a viewer is fast-forward advancing through a movie, the viewer will be informed of how far into the movie the video has been advanced with text information at designated review speed adjustment markers.

Video example 302(4) displays a short video clip 322 at a normal playback speed while the video review rate of video example 302(4) slows down from 100x to 3x and back up to 100x over time duration 306. The short video 322 can convey any message to a viewer, such as a news note, a sports play, a movie scene, the first five seconds of a commercial, etc.

When video images are displayed in a fast rewind advance mode, a review speed adjustment marker designation point 310, which is a duration ending designation point of the review speed adjustment marker, will be recognized first. To display information corresponding to a review speed adjustment marker over time duration 306 when rewinding a video, a video content processor can jump ahead in the video content to the beginning 308 of the review speed adjustment marker and pre-process the information for display in the order intended. For example, the review speed adjustment marker can provide a cue to the video processor to scan ahead of the ending designation point and regenerate the MPEG data from the key-frames and intermediate frames as if they were being played forward.

In addition to the video applications, review speed adjustment markers can be implemented for audio applications, such as audio content recorded on a compact disc (CD) or stored in a solid state digital audio device. For example, a listener can fast advance through a recorded lecture, or a recorded book (commonly referred to as a "book-on-tape"), and the fast advance is slowed at significant points of the digital media when a media processor recognizes a review speed adjustment marker.

Figure 4:
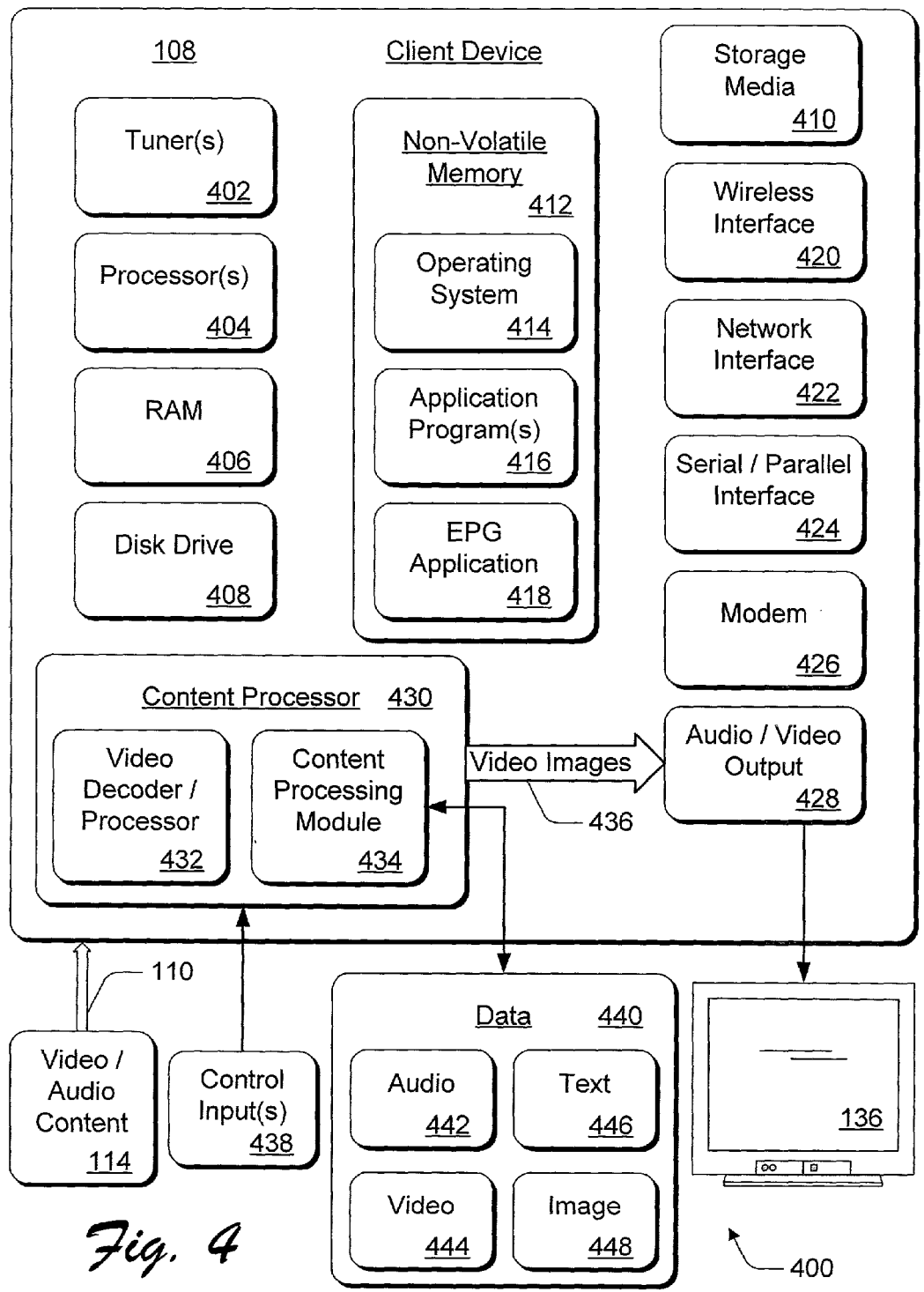
FIG. 4 illustrates various components of an exemplary client device implemented in an exemplary review speed adjustment marker system.

FIG. 4 illustrates an exemplary review speed adjustment marker system 400 that includes selected components of television system 100, such as an exemplary client device 108 shown in FIGS. 1 and 2. Client device 108 can be implemented as a digital video recorder or a personal video recorder and includes components to implement review speed adjustment marker recognition and processing.

Client device 108 includes one or more tuners 402 which are representative of one or more in-band tuners that tune to various frequencies or channels to receive television signals, as well as an out-of-band tuner that tunes to the broadcast channel over which the EPG data is broadcast to client device 108. Client device 108 also includes one or more processors 404 (e.g., microprocessors) which process various instructions to control the operation of client device 108 and to communicate with other electronic and computing devices.

Client device 108 can be implemented with one or more memory components, examples of which include a random access memory (RAM) 406, a disk drive 408, mass storage media 410, and a non-volatile memory 412 (e.g., ROM, Flash, EPROM, EEPROM, etc.). The memory components (e.g., RAM 406, disk drive 408, storage media 410, and non-volatile memory 412) store various information and/or data such as received content, EPG data, configuration information for client device 108, and/or graphical user interface information.

Alternative implementations of client device 108 can include a range of processing and memory capabilities, and may include more or fewer types of memory components than those illustrated in FIG. 4. For example, full-resource clients can be implemented with substantial memory and processing resources, including the disk drive 408 to store content for replay by the viewer. Low-resource clients, however, may have limited processing and memory capabilities, such as a limited amount of RAM 406, no disk drive 408, and limited processing capabilities.

An operating system 414 and one or more application programs 416 may be stored in non-volatile memory 412 and executed on processor 404 to provide a runtime environment. A runtime environment facilitates extensibility of client device 108 by allowing various interfaces to be defined that, in turn, allow application programs 416 to interact with client device 108. In the illustrated example, an EPG application 418 is stored in memory 412 to operate on the EPG data and generate a program guide. The application programs 416 that may be implemented at client device 108 can include a browser to browse the Web (e.g., "World Wide Web"), an email program to facilitate electronic mail, and so on. Client device 108 can also include other components pertaining to a television entertainment and information system which are not illustrated in this example. For instance, client device 108 can include a user interface application and user interface lights, buttons, controls, and the like to facilitate viewer interaction with the device.

Client device 108 further includes a wireless interface 420, a network interface 422, a serial and/or parallel interface 424, and a modem 426. Wireless interface 420 allows client device 108 to receive input commands and other information from a user-operated input device, such as from a remote control device or from another IR, Bluetooth, or similar RF input device.

Network interface 422 and serial and/or parallel interface 424 allows client device 108 to interact and communicate with other electronic and computing devices via various communication links. Although not shown, client device 108 may also include other types of data communication interfaces to communicate with other devices. Modem 426 facilitates client device 108 communication with other electronic and computing devices via a conventional telephone line. Client device 108 also includes an audio and/or video output 428 that provides signals to television 136 or to other devices that process, display, and/or otherwise render the audio and video data.

Client device 108 has a content processor 430 which includes a video decoder and/or processor 432 and a content processing module 434. The content processor 430, video decoder and/or processor 432, and the content processing module 434 can each be implemented as a software component that executes on a processor 404 and is stored in non-volatile memory 412.

Video decoder 432 can be an MPEG-2 or MPEG-4 (Moving Pictures Experts Group) decoder, for example, that decodes MPEG-encoded content. MPEG-2 supports a variety of audio/video formats, including legacy TV, HDTV (high-definition television), DVD (digital versatile disc), and five-channel surround sound. Video decoder 432 receives video and/or audio content 114 (identified in FIG. 1 as "stored content") and decodes, or otherwise processes, the video data and audio data contained in the content stream. Video decoder 432 generates video images 436 that are formatted for display on display device 136, and generates decoded audio data that is formatted for broadcast by a broadcast device, such as one or more speakers (not shown) in display device 136. It is to be appreciated that the systems and methods described herein can be implemented for any type of encoding format as well as for data and/or content streams that are not encoded. Further, the systems and methods can be implemented for any digital audio or video medium rendered with any solid state or digital device, such as an MP-3 player.

Content processing module 434 performs several operations for review speed adjustment marker processing. For example, content processing module 434 communicates the video images 436 to the audio and/or video output 328 to have the video images rendered on display device 136 in a fast advance mode, to include fast-forward advance and rewind advance modes. Content processing module 434 processes the video images to display corresponding video images on display device 136. Content processing module 434 can include a microcontroller, integrated circuit, or similar video processing component to process the images.

The video images can be rendered in the fast advance mode when a viewer selects, or otherwise enables, a fast-forward advance or rewind advance selectable control on a control input device. Content processing module 434 receives viewer selections as control inputs 438, such as from viewer-operated remote control device 204, handheld device 206, and/or keyboard 208. The input commands may be input via an RF, IR, Bluetooth, or similar communication link or other mode of transmission to communicate with content processing module 434.

Content processing module 434 also recognizes a review speed adjustment marker in the video and/or audio content 114, obtains information corresponding to the review speed adjustment marker from data 440, and communicates the information for playback at normal speed on display device 136. Content processing module 434 directs slowing a video fast advance at a review speed adjustment marker so that the information corresponding to the review speed adjustment marker is rendered at normal playback speed that is discernable to the viewer, such as normal playback or at a low multiple of the normal playback speed (e.g., "3x" FIG. 3). The module 434 also controls speeding up the fast advance after a review speed adjustment marker to resume the fast-forward or rewind advance mode.

The data 440 includes audio content 442, video content 444, text information 446, still image data 448, and, although not shown, may include any other information or data stored in an electronic format. The data 440 can be implemented as a memory component of a content provider 102, a network operator (e.g., content distribution system 106), or within a client device 108, and as any one of the example memory components, such as RAM 406, disk drive 408, storage media 410, and/or non-volatile memory 412. Alternatively, data 440 can be obtained from another service, or can be included as a separate broadcast audio track or separate broadcast video stream.

Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Methods for Review Speed Adjustment Markers

Methods for review speed adjustment marker processing may be described in the general context of computer-executable instructions. Generally, computer-executable instructions include routines, programs, objects, components, data structures, and the like that perform particular functions or implement particular abstract data types. Methods for review speed adjustment marker processing may also be practiced in distributed computing environments where functions are performed by remote processing devices that are linked through a communications network. In a distributed computing environment, computer-executable instructions may be located in both local and remote computer storage media, including memory storage devices.

Figure 5:
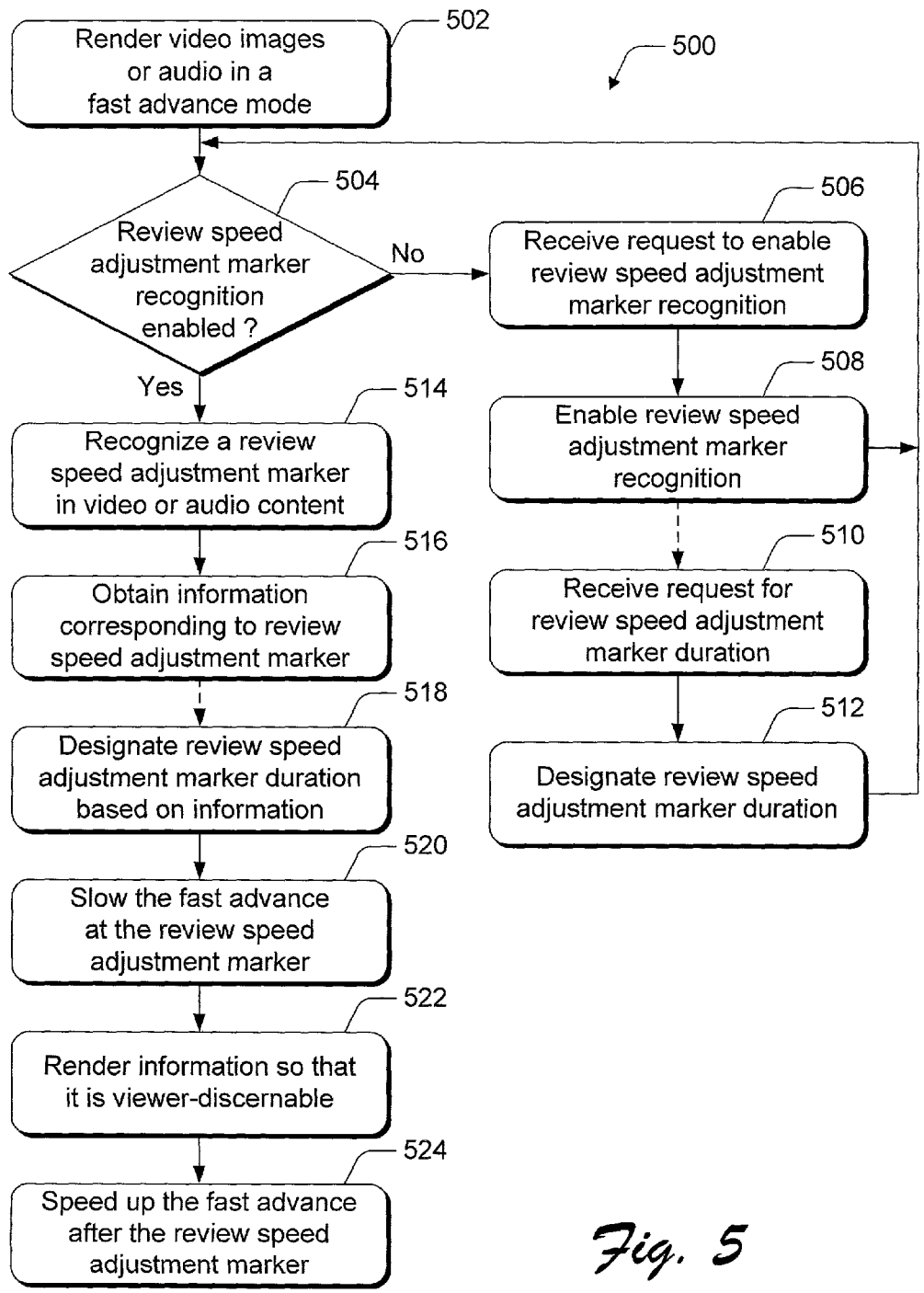
FIG. 5 is a flow diagram that illustrates a procedure for review speed adjustment markers processing.

FIG. 5 illustrates a method 500 for review speed adjustment marker processing. The order in which the method is described is not intended to be construed as a limitation, and any number of the described method blocks can be combined in any order to implement the method. Furthermore, the method can be implemented in any suitable hardware, software, firmware, or combination thereof.

At block 502, audio and/or video images are rendered in a fast advance mode on a display device. For example, the video images 436 are generated from video content 114, and can be rendered both in fast-forward advance and in rewind advance mode. The video images can be rendered in the fast advance mode when a viewer selects, or otherwise enables, a fast-forward advance or rewind advance selectable control on remote control input device 204.

At block 504, a determination is made as to whether review speed adjustment marker recognition is enabled. Review speed adjustment marker recognition may be a viewer-selectable feature when fast advancing through video content and/or images. If review speed adjustment marker recognition is not enabled (i.e., "no" from block 504), a request to enable review speed adjustment marker recognition is received at block 506, and at block 508, review speed adjustment marker recognition is enabled. For example, content processing module 434 receives a viewer request to enable review speed adjustment marker recognition as control input 438 from remote control input device 204.

Optionally, at block 510, a request to establish, or otherwise designate, a review speed adjustment marker duration is received, and at block 512, the review speed adjustment marker duration is designated. For example, content processing module 434 receives a viewer request to establish, or otherwise designate, time duration 306 for which information corresponding to a review speed adjustment marker is rendered. Processing module 434 designates the review speed adjustment marker time duration upon receiving the request as a control input 438 when a viewer selects, or otherwise enables, selectable controls on remote control input device 204.

If review speed adjustment marker recognition is enabled (i.e., "yes" from block 504), a review speed adjustment marker is recognized in the audio or video content at block 514. For example, content processing module 434 recognizes an indication of a review speed adjustment marker 304 in video content 302. It should be noted that any number and type of review speed adjustment marker indicators can be included in video content to provide an indication to a processing module, such as flags, data bits, and the like. Further, a review speed adjustment marker may be recognized as a predefined index point in the video content.

In addition to review speed adjustment marker recognition being enabled so that the content processing module 434 recognizes a review speed adjustment marker, processing a review speed adjustment marker can be enabled, or otherwise selectable, based on the fast advance mode review rate. For example, the fast advance review rate may not be adjusted for a slower review rate of 15x (where "x" is a normal playback speed) because the video may still be discernable at that review speed, but may be adjusted (i.e., slowed down) for a review rate of 60x when the video may not be discernable.

At block 516, information corresponding to the review speed adjustment marker is obtained. For example, content processing module 434 obtains information such as audio content 442, video content 444, text information 446, or still image data 448, from data 440. The information can be maintained in a client device 108, downloaded from a content provider 102, or obtained from a network operator.

As an alternative to the operations described for blocks 510 and 512, a review speed adjustment marker duration is designated based on the information corresponding to the review speed adjustment marker at block 518. For example, content processing module 434 can determine the information type (e.g., video, audio, still images, text information) and designate the review speed adjustment marker duration 306 for which information corresponding to the review speed adjustment marker is rendered. Further, a review speed adjustment marker duration can be designated, or information for the marker duration can be contained, in the review speed adjustment marker itself.

At block 520, the fast advance is slowed at the review speed adjustment marker, and the information corresponding to the review speed adjustment marker is rendered at block 522 such that the information is viewer-discernable. For example, the information may be audio content 442 or still image data 448 that conveys a message to a viewer at the slower advance speed, such as advertisement logo 312, or recognizable audio 318 that is associated with a particular advertising. Rather than fast-forwarding through thirty seconds of video for a commercial in five seconds, a viewer can discern five seconds of a still image or audio and associate the image and/or audio with an advertisement. For example, an advertising logo such as the large green "X" logo for an Xbox™ game system can be displayed as a still image commercial or advertisement to entice a viewer to stop the fast advance of the video and watch the video commercial associated with the still image advertisement. The Xbox™ game system and the "X" logo are registered trademarks of the Microsoft Corporation, Redmond Wash.

At block 524, the fast advance is sped-up after the review speed adjustment marker, or after the review speed adjustment marker duration. Content processing module 434 continues to repeat method 500 for each review speed adjustment marker that is recognized when processing video and/or audio content 114 to render video images or audio in a fast advance mode (block 502).

Figure 6:
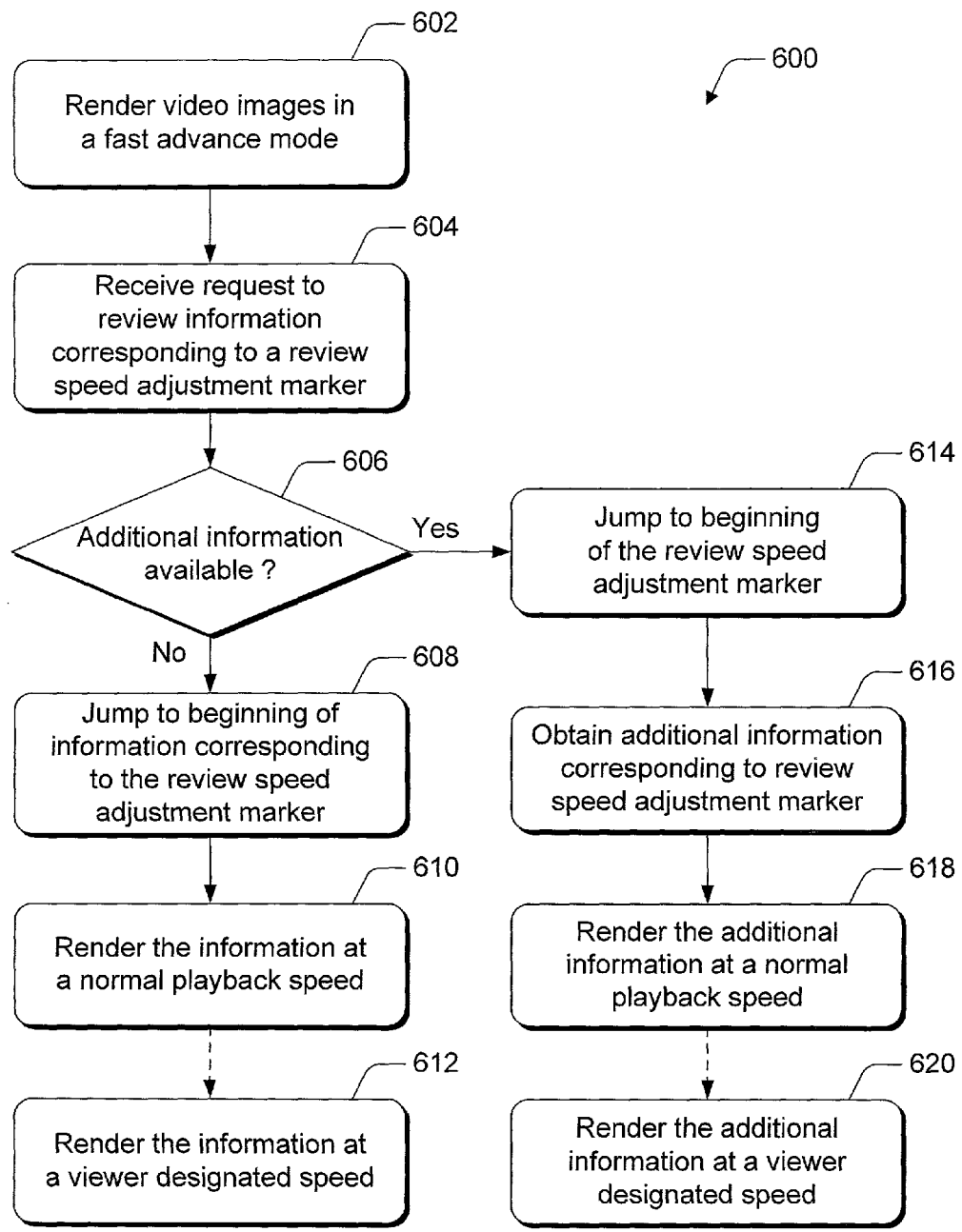
FIG. 6 is a flow diagram that illustrates a procedure for review speed adjustment markers processing.

FIG. 6 illustrates a method 600 for review speed adjustment marker processing. The order in which the method is described is not intended to be construed as a limitation, and any number of the described method blocks can be combined in any order to implement the method. Furthermore, the method can be implemented in any suitable hardware, software, firmware, or combination thereof.

At block 602, video images are rendered in a fast advance mode on a display device. The video images are generated from video content, and can be rendered both in fast-forward advance and in rewind advance mode. The video images can be rendered in the fast advance mode when a viewer selects, or otherwise enables, a fast-forward advance or rewind advance selectable control on remote control input device 204.

At block 604, a viewer request to review information corresponding to a review speed adjustment marker is received. For example, when the information corresponding to a review speed adjustment marker is rendered so that it is viewer-discernable (FIG. 5, block 522), and the viewer releases, or otherwise disables, the fast-forward advance or rewind advance on remote control input device 204, content processing module 434 receives a control input 438 to indicate the review request.

At block 606, a determination is made as to whether additional information corresponding to the review speed adjustment marker is available. For example, when content processing module 434 recognizes a review speed adjustment marker in the video content (FIG. 5, block 514), an indication of additional information corresponding to the review speed adjustment marker can also be obtained. It should be noted that any number and type of indicators can be included in video content to provide an indication to a processing module, such as flags, data bits, and the like. Alternatively, or in addition, a particular data file 440 corresponding to the review speed adjustment marker can maintain an indication of whether additional information is available.

If there is not additional information corresponding to the review speed adjustment marker (i.e., "no" from block 606), the method jumps to a beginning of the information corresponding to the review speed adjustment marker at block 608, and at block 610, the information is rendered at a normal playback speed (i.e., not fast-forward and not slow-motion). Alternatively, or in addition to the information being rendered at a normal playback speed, the information corresponding to the review speed adjustment marker is rendered at a viewer designated speed at block 612. For example, content processing module 434 can receive a control input 438 that is a viewer designation to playback the information at a particular speed, either forward or backward, and faster or slower than normal playback speed.

If there is additional information corresponding to the review speed adjustment marker (i.e., "yes" from block 606), the method jumps to a beginning of the review speed adjustment marker at block 614. At block 616, the additional information corresponding to the review speed adjustment marker is obtained. An example is described following for first obtaining information corresponding to a recognized review speed adjustment marker, and then obtaining additional information corresponding to the review speed adjustment marker.

When the video images are rendered in a fast advance mode (FIG. 5, block 502), and the content processing module 434 recognizes a review speed adjustment marker (block 514), the fast advance is slowed so that the information is viewer-discernable (blocks 520-522). The information may be audio content 442 or still image data 448 that conveys a message to a viewer at the slower advance speed, such as advertisement logo 312, or recognizable audio 318 that is associated with a particular advertisement. When the viewer requests to review the information or commercial that corresponds to advertisement logo 312 or recognizable audio 318, content processing module 434 obtains the thirty seconds of video for the commercial from video content 444.

At block 618, the additional information is rendered at a normal playback speed. Alternatively, or in addition to the information being rendered at a normal playback speed, the information corresponding to the review speed adjustment marker is rendered at a viewer designated speed at block 620. For example, content processing module 434 can receive a control input 438 that is a viewer designation to playback the additional information at a particular speed, either forward or backward, and faster or slower than normal playback speed.

Conclusion

Although the systems and methods have been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A method, comprising:
rendering video images generated from video content at a fast advancing rendered speed, wherein the fast advancing rendered speed is greater than a normal playback speed;
recognizing a review speed adjustment marker in the video content;
obtaining information corresponding to the review speed adjustment marker;
slowing the fast advance of the rendered video images at the review speed adjustment marker to a designated review speed for a defined time duration, wherein:
the review speed is defined by the obtained information of the review speed adjustment marker and the review speed is less than the fast advancing rendered speed and is different than the normal playback speed; and
the defined time duration is viewer defined via a viewer preference;
receiving a viewer request to review the rendered video images corresponding to the review speed adjustment marker during the defined time duration;
obtaining additional information corresponding to the review speed adjustment marker upon receiving the viewer request to review the rendered video images corresponding to the review speed adjustment marker, wherein obtaining the additional information corresponding to the review speed adjustment marker includes downloading the additional information from a content provider;
jumping to a beginning of the review speed adjustment marker; and
rendering the additional information at the normal playback speed.

2. A method as recited in claim 1, further comprising resuming the fast advance after the review speed adjustment marker.

3. A method as recited in claim 1, wherein obtaining the additional information includes obtaining audio information corresponding to the review speed adjustment marker.

4. A method as recited in claim 1, wherein obtaining the additional information includes obtaining text information corresponding to the review speed adjustment marker.

5. A method as recited in claim 1, wherein obtaining the additional information includes obtaining still image information corresponding to the review speed adjustment marker.

6. A method as recited in claim 1, wherein recognizing the review speed adjustment marker includes recognizing an index point in the video content as the review speed adjustment marker.

7. A method as recited in claim 1, further comprising enabling the recognizing of the review speed adjustment marker when receiving a viewer request to enable review speed adjustment marker recognition.

8. A method, comprising:
rendering video images in a fast advance mode at a fast advancing rendered speed greater than a normal playback speed, the video images generated from video content;
recognizing a review speed adjustment marker in the video content if the fast advancing rendered speed is greater than a predetermined speed;
obtaining information corresponding to the review speed adjustment marker, wherein obtaining the information corresponding to the review speed adjustment marker includes downloading the information from a content provider;
slowing the fast advance of the generated video images at the review speed adjustment marker to a designated review speed for a defined duration, wherein:
the review speed is defined by obtained information from the review speed adjustment marker and the review speed is less than the fast advancing rendered speed and is different than the normal playback speed; and
the defined time duration is viewer defined via a viewer preference;
rendering the information corresponding to the review speed adjustment marker, wherein the information comprises data delivered via an auxiliary data channel separate from a data channel that delivered the video images;
receiving a viewer request to review rendered video images corresponding to the review speed adjustment marker during the defined time duration;
obtaining additional information corresponding to the review speed adjustment marker upon the viewer request to review the rendered video images corresponding to the review speed adjustment marker;
jumping to a beginning of the review speed adjustment marker; and
rendering the additional information at the normal playback speed.

9. A method as recited in claim 8, wherein rendering the video images includes rendering the video images in a fast-forward advance mode.

10. A method as recited in claim 8, wherein rendering the video images includes rendering the video images in a rewind advance mode.

11. A method as recited in claim 8, wherein obtaining the information includes obtaining additional video information.

12. A method as recited in claim 8, wherein obtaining the information includes obtaining audio information.

13. A method as recited in claim 8, wherein obtaining the information includes obtaining text information.

14. A method as recited in claim 8, wherein obtaining the information includes obtaining still image information.

15. A method as recited in claim 8, further comprising
jumping to a beginning of the information corresponding to the review speed adjustment marker to render the information at the normal playback speed.

16. A method as recited in claim 8, further comprising
jumping to a beginning of the video images corresponding to the review speed adjustment marker to render the video images at a viewer designated speed, wherein the viewer designated speed is less than the fast advancing rendered speed and is different than the normal playback speed.

17. A method as recited in claim 8, further comprising enabling the recognizing of the review speed adjustment marker when receiving a viewer request to enable review speed adjustment marker recognition.

18. A client device, comprising:
a video processor coupled to receive video content and configured to generate video images from the video content;
a content processing module configured to:
communicate the video images to a display device to fast advance the video images at a fast advancing rendered speed, wherein the fast advancing rendered speed is greater than a normal playback speed;
recognize a review speed adjustment marker in the video content if the fast advancing rendered speed is greater than a predetermined speed;
obtain information corresponding to the review speed adjustment marker;
communicate the information to the display device; and slow the fast advance of the video images at the review speed adjustment marker to a designated review speed for a defined time duration, wherein:
  the review speed is defined by information in the review speed adjustment marker and the review speed is less than the fast advancing rendered speed and is different than the normal playback speed; and
  the defined time duration is viewer defined via a viewer preference;
receive a viewer request to review the video images corresponding to the review speed adjustment marker during the defined time duration;
obtain additional information corresponding to the review speed adjustment marker upon receiving the viewer requests to review the video images corresponding to the review speed adjustment marker, wherein obtaining the additional information corresponding to the review speed adjustment marker includes downloading the additional information from a content provider;
communicate the additional information to the display device for playback at the normal playback speed;
jump to a beginning of the review speed adjustment marker to render the video images at the normal playback speed; and
render the additional information at the normal playback speed.

19. A client device as recited in claim 18, wherein the content processing module is further configured to speed-up the fast advance after the time duration.

20. A client device as recited in claim 18, wherein the content processing module is configured to obtain video information as the additional information corresponding to the review speed adjustment marker.

21. A client device as recited in claim 18, wherein the content processing module is configured to obtain audio information as the additional information corresponding to the review speed adjustment marker.

22. A client device as recited in claim 18, wherein the content processing module is configured to obtain text information as the additional information corresponding to the review speed adjustment marker.

23. A client device as recited in claim 18, wherein the content processing module is configured to obtain still image information as the additional information corresponding to the review speed adjustment marker.

24. A digital video recording system comprising the client device as recited in claim 18.

25. A client device, comprising:
a content processor coupled to receive content and configured to:
  communicate the content to a rendering device to render the content in a fast advance mode at a fast advancing rendered speed, wherein the fast advancing rendered speed is greater than a normal playback speed;
  recognize a review speed adjustment marker in the content if the fast advancing rendered speed is greater than a predetermined speed;
  obtain information corresponding to the review speed adjustment marker;
  slow the fast advance of the rendered content at the review speed adjustment marker to a designated review speed for a defined time duration, wherein:
    the review speed is defined by information in the review speed adjustment marker and the review speed is less than the fast advancing rendered speed and is different than the normal playback speed; and
    the defined time duration is viewer defined via a viewer preference
  receive a viewer request to review the video images corresponding to the review speed adjustment marker during the defined time duration;
  obtain additional information corresponding to the review speed adjustment marker upon receiving the viewer request to review the video images corresponding to the review speed adjustment marker, wherein obtaining the additional information corresponding to the review speed adjustment marker includes downloading the additional information from a content provider;
  communicate the additional information to the display device for playback at the normal playback speed;
  jump to a beginning of the review speed adjustment marker; and
  render the additional information at the normal playback speed.

26. A digital video recording system comprising the client device as recited in claim 25.

27. A computing system comprising the client device as recited in claim 25.

28. A system comprising:
a processor; and
one or more computer-executable instructions that, when executed by the processor, direct a client device to:
  communicate video content to a display device to render video images in a fast advance mode at a fast advancing rendered speed, wherein fast advancing rendered speed is greater than a normal playback speed;
  recognize a review speed adjustment marker in the video content if the fast advancing rendered speed is greater than a predetermined speed;
  obtain information corresponding to the review speed adjustment marker, wherein obtaining the information corresponding to the review speed adjustment marker includes downloading the information from a content provider;
  communicate the information to the display device;
  slow the fast advance of the video content at the review speed adjustment marker to a designated review speed for a defined time duration, wherein:
    the review speed is defined by information obtained from the review speed adjustment marker and the review speed is less than the fast advancing rendered speed and is different than the normal playback speed; and
    the defined time duration is viewer defined via a viewer preference;
  receive a viewer request to review the video images corresponding to the review speed adjustment marker during the defined time duration;
  obtain additional information corresponding to the review speed adjustment marker upon receiving the viewer request to review the video images corresponding to the review speed adjustment marker, wherein obtaining the additional information corresponding to the review speed adjustment marker includes downloading the additional information from a content provider;
  communicate the additional information to the display device for playback at the normal playback speed;
  jump to a beginning of the review speed adjustment marker; and
  render the additional information at the normal playback speed.

* * * * *